(No Model.)
G. W. NIEDRINGHAUS.
ATTACHING HANDLES AND COVERS TO VESSELS.
No. 517,230. Patented Mar. 27, 1894.
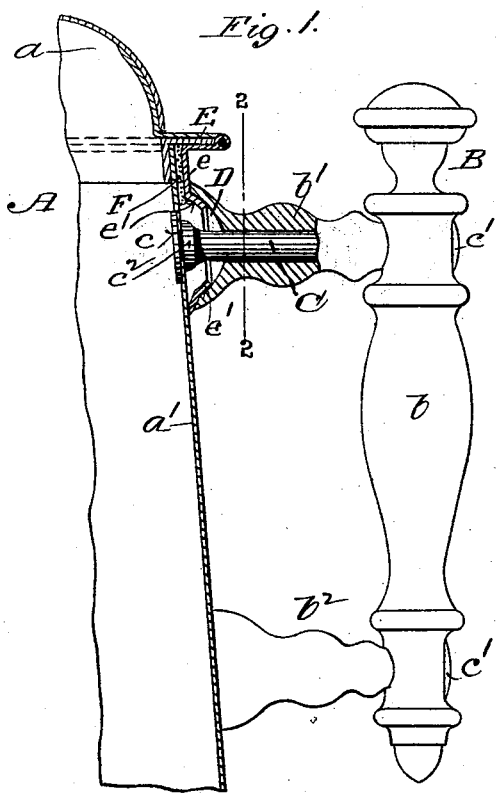
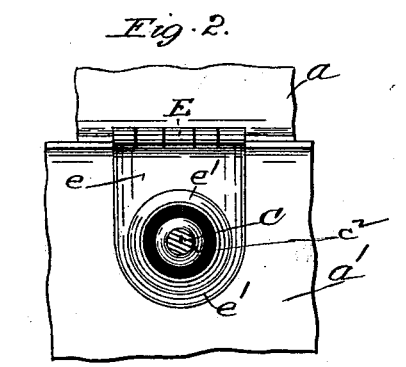
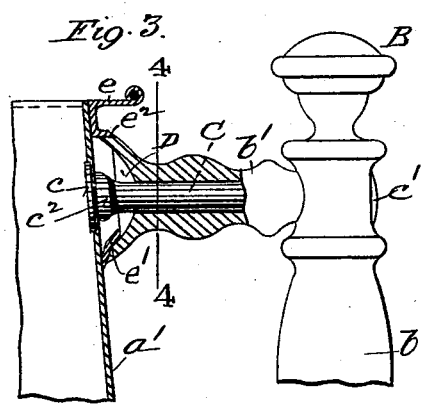
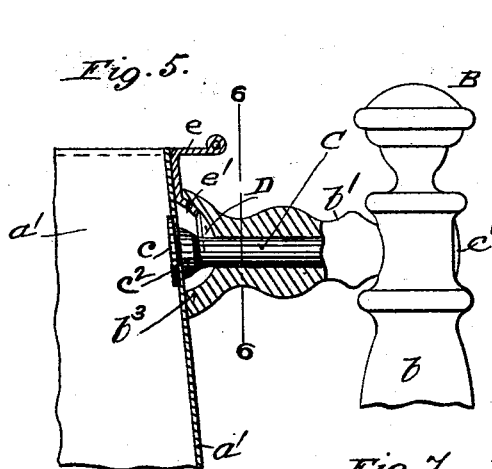
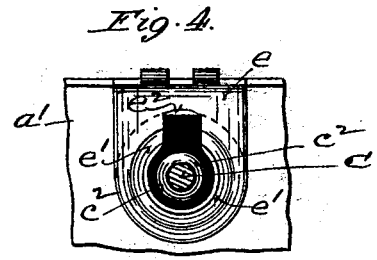
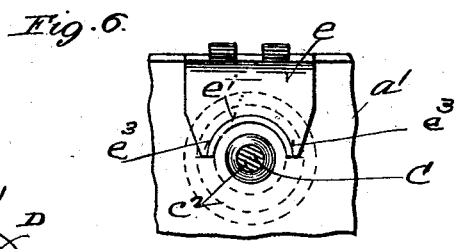
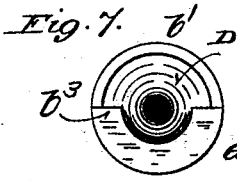
WITNESSES
Edward W. Furrell
A. Bonville
INVENTOR
George W. Niedringhaus
by C. P. Mosby
his atty
THE NATIONAL LITHOGRAPHING COMPANY,
WASHINGTON, D. C.

UNITED STATES PATENT OFFICE.

GEORGE W. NIEDRINGHAUS, OF ST. LOUIS, MISSOURI, ASSIGNOR TO THE ST. LOUIS STAMPING COMPANY, OF SAME PLACE.

ATTACHING HANDLES AND COVERS TO VESSELS.

SPECIFICATION forming part of Letters Patent No. 517,230, dated March 27, 1894.

Application filed September 19, 1893. Serial No. 485,882. (No model.)

*To all whom it may concern:*

Be it known that I, GEORGE W. NIEDRINGHAUS, of St. Louis, Missouri, have made a new and useful Improvement in Attaching Handles and Covers to Vessels, of which the following is a full, clear, and exact description.

The chief object of my invention is to provide an improved means for attaching the cover of a vessel to the body thereof, and more especially the cover of a sheet-metal vessel, and it consists chiefly in the mode of connecting the cover-hinge, or whatever equivalent part the cover may have, with the vessel-handle, substantially as is hereinafter set forth and claimed, aided by the annexed drawings, making part of this specification, in which—

Figure 1 is a sectional elevation of a vessel having the improvement embodied therein; only that portion of the vessel necessary for an understanding of the improvement is exhibited; Fig. 2 a vertical section on the line 2—2 of Fig. 1; Fig. 3 a view analogous to that of Fig. 1 but showing an additional feature; Fig. 4 a section on the line 4—4 of Fig. 3; Fig. 5 a view analogous to that of Fig. 1 but showing an additional feature; Fig. 6 a vertical section on the line 6—6 of Fig. 5, and Fig. 7 an elevation of the inner end of that form of the handle-arm that is shown in Fig. 5.

The same letters of reference denote the same parts.

A represents the vessel, and $a$ the cover thereof. The vessel may be of any size and style to which the present improvement is adaptable.

B represents a handle for the vessel. In the present illustration the handle consists of an upright portion $b$ and the horizontally-extended arms $b'$, $b^2$. Any equivalent form of handle may be used which permits of the present improvement being carried out. In the present instance the handle is attached to the shell $a'$ of the vessel by means of the rivets such as shown at C. One of these rivets is used for connecting the handle at the upper part thereof, and a similar one may be used for connecting the handle at the lower part thereof. The preferred form of rivet is shown. It has a head $c$ which comes against the inner side of the shell of the vessel, and the rivet projects outward through the shell of the vessel (which is perforated suitably to permit of the passage of the rivet) and it extends through the arm $b'$ of the handle, and at its outer end the handle may be secured by means of solder $c'$ applied to the outer end of the rivet. The rivet, upon the outer side of the vessel-shell, may have an enlargement, $c^2$. But whether the rivet is enlarged or not at that point it can be, and preferably is, tightened in its place in the vessel-shell by having a portion of it upset in the ordinary manner against the vessel-shell substantially as shown. The handle, at its point or points of contact with the vessel-shell, or with any interposed part that may come between the handle-end and the vessel-shell, is hollowed out so as to form some kind of chamber or recess D. This recess may be variously shaped and extended so long as it permits of the insertion of some portion of the hinge-leaf so that the two parts may become interlocked.

E represents the cover-hinge which serves to connect the cover with the vessel-body. The hinge is attached to the cover in any suitable manner, and the hinge may be of any suitable and ordinary shape saving as modified by the improvement under consideration.

This improvement consists in extending and shaping the lower hinge-leaf $e$ so that it shall enter the recess or chamber in the handle arm and become interlocked therewith and more especially in a vertical direction. To this end the leaf $e$ is extended say in the form shown in Figs. 1 and 2; that is, in the form of a perforated convex or crowned shape $e'$ which fits into the chamber D and against ths inner face of the handle-arm. The leaf-extension is not designed to engage with the rivet C, but it is intended to bear downward upon some part of the handle or handle-arm, and also upward, and also laterally, upon some part of the handle or handle-arm, so that it shall be held in place. If desired the hinge may, as indicated at F, be soldered to the vessel shell. But whether attached in that manner to the vessel-shell or not the leaf is held in place substantially by means of its being interlocked with the handle arm in the manner described. I do not restrict myself to any special part of the handle or handle-arm in the respect mentioned. The result can be obtained in the manner indicated in Figs. 1 and 2. Or, again, the hinge-leaf, in addition to the flange $e'$ which bears more or less against the inner side of the handle-arm, may have a projection, $e^2$, which bears downward upon the outer side of the inner end of the handle-arm, substantially as shown in Fig. 3. This projection, $e^2$, may or may not be auxiliary to that portion of the leaf-flange $e'$, which bears against the inner side of the end of the handle arm. That is, it may be a portion of the flange $e'$ which is struck up to bear upon the handle arm as indicated in Fig. 3, or it may be an additional piece applied to the hinge-leaf and the flange $e'$, may be annular in shape. An additional feature is illustrated in Figs. 5, 6 and 7. Instead of the chamber D being cup-shaped as shown in Figs. 1 and 3 it is approximately half-cup-shaped as shown more distinctly in Fig. 7, and there is a ledge, $b^3$, in the arm at the bottom of the chamber therein, and the hinge-leaf, while having the flange $e'$ arranged to come against the inner side of the handle-arm at the upper part thereof, is adapted at $e^3$, to bear downward upon the ledge referred to. But however made the hinge-leaf and the recess or chamber in the handle-arm are so relatively constructed as to cause the hinge leaf to be held in the handle-arm vertically and laterally when the handle is attached to the vessel-body. As the hinge-leaf and the handle are thus interlocked when the handle is in position it is not essential that the handle be attached to the vessel-body by means of any special form of rivet, or indeed any special style of fastening, so long as the hinge-leaf and handle are interlocked and are bound between the handle and the vessel-shell, or any part interposed between said hinge-leaf and shell.

I claim—

The combination of the vessel-body, the hinge-leaf and the handle, said handle being secured to said vessel-body, and said hinge-leaf being interlocked with said handle and also being held between said vessel body and handle, substantially as described.

Witness my hand this 13th day of September, 1893.

GEORGE W. NIEDRINGHAUS.

Witnesses:
C. D. MOODY,
A. BONVILLE.